Nov. 21, 1933.    C. RINGWALD    1,935,994

GASEOUS TUBE SIGN AND THE LIKE

Filed June 3, 1929

Witness:
William P. Kilroy

Inventor:
Clarence Ringwald
By Brown, Jackson, Boettcher & Dienner
Attys

Patented Nov. 21, 1933

1,935,994

UNITED STATES PATENT OFFICE 1,935,994

GASEOUS TUBE SIGN AND THE LIKE

Clarence Ringwald, Springfield, Ohio

Application June 3, 1929. Serial No. 367,923

7 Claims. (Cl. 40—130)

This invention relates particularly to gaseous tube signs and the like and shall be described in connection with such signs, but it is to be understood that, in its broader aspects, the invention is not limited to use with gaseous tubes, nor to use in sign devices. Therefore, in the appended claims, where the term "luminous tube" is employed, I intend to cover luminous tubes which are not gaseous, as well as gaseous tubes and where the sign is not specifically recited, I intend to cover uses of the invention in devices other than signs.

With the advent, particularly, of "neon" and other gaseous tube signs, the matter of mounting the gaseous tubes has presented a considerable practical problem. The present practice is to support the tubes upon insulators and to employ attachment fittings between the tubes and insulators, which will permit expansion and contraction of the tubes.

These previous attachment fittings have depended upon a looseness in the mounting of the tube to allow for the expansion and contraction of the tube. This introduces a difficulty which my present invention meets, namely, great fragility and great tube breakage losses, particularly in shipment and handling. These insulator supports have also been costly, considerably increasing the cost of the entire structure and they are not moisture proof. The pockets for the electrode terminal portions of the tube have been particularly susceptible to leakage and the matter of sealing the tube leads has been difficult and ineffective. In addition, it has been necessary to finish the inside surface of the casing or the surface of the other backing upon which the tube is displayed.

It is an object of this invention to provide a generally improved, simplified and relatively inexpensive tube mounting with which the aforesaid disadvantages may be reduced or avoided.

A more specific object is the provision of a tube mounting eliminating the insulator supports heretofore required, as well as the attachment fittings between the tubes and these supports and the looseness heretofore required, as above pointed out. The elimination of the insulator supports and attachment fittings heretofore required greatly reduces the cost and the elimination of the looseness in the tube mounting, makes the structure more sturdy and materially reduces or eliminates tube breakage.

The present invention also reduces or eliminates moisture leakage, particularly through the pockets for the electrode portions of the tube, or around the electrode portions of the tube. The sealing of the tube leads is improved both in eliminating considerable structure heretofore required and in the results obtained.

Another feature of the present invention resides in eliminating the finishing of the inside surface of the sign casing or the surface of the other backing upon which the tube is displayed, as heretofore required.

The present invention also provides an improved manner of sealing in the transformer where a transformer is employed and where this sealing in provision is desired.

Now, in order to acquaint those skilled in the art with the manner of constructing and using a device embodying the present invention, I shall describe in connection with the accompanying drawing certain illustrative embodiments of the invention.

Figure 1:
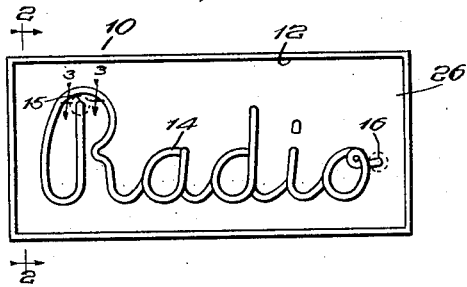
Figure 1 is a front elevational view of a gaseous tube sign embodying the present invention.
Figure 2:
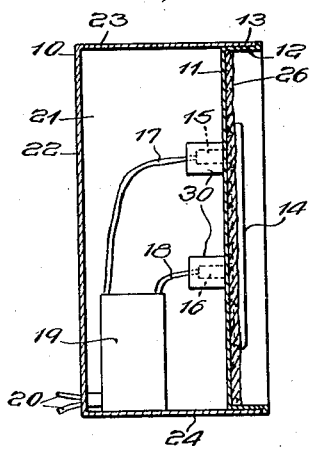
Figure 2 is a vertical section taken on the line 2—2 of Figure 1.
Figure 3:
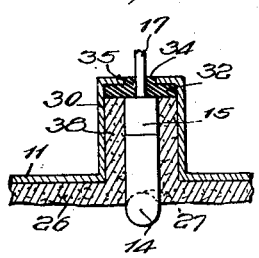
Figure 3 is an enlarged detail section through one of the pockets in the tube backing member for the terminal portion of the tube, taken on the line 3—3 of Figure 1 and showing the manner of hermetically sealing the electrode portion of the tube and the lead thereto.

Referring, first, to the embodiment of Figures 1 to 3, the casing of the sign is shown more or less diagrammatically and merely for the purpose of illustrating a sign casing. This casing is designated in its entirety at 10 and may be of any existing or subsequently developed construction. These casings are now usually of suitable sheet metal construction. The tube backing indicated at 11 may, likewise, be of any suitable or preferred construction, that shown being again merely illustrative. The particular backing 11 shown comprises a sheet metal pan flanged marginally at 12 and suitably secured at 13 in the front of the casing 10. In this particular instance, the backing 11 forms a common backing for the entire display, but separate backings may be employed for the separate letters or for other separate parts of the luminous display, as will be hereinafter more fully pointed out. So far as the present invention is concerned, I intend to cover the mounting of the tube or tubes upon a suitable backing, regardless of whether the tube and backing combination is employed in a sign or in devices for other than strictly sign purposes and irrespective of the particular structure and mounting of the backing itself. This backing constitutes the support for the tube or tubes.

In the embodiment of Figures 1 to 3, the single tube is designated at 14 and is formed to spell out the word "Radio". The particular word or other display may vary widely. The tube 14 is preferably a gaseous tube, but as already pointed out, I intend that, in its broader aspects, the present invention shall cover other equivalent tubes that are not gaseous. Where the tube is a gaseous tube and the present invention has particular utility and advantages, with such tubes, neon is now commonly used where a red light is desired, argon and mercury vapor or the like for a green light, and argon and some other chemical in neon gas for a blue light. The particular gas employed may vary widely and the present invention is particularly applicable to any gaseous tube, regardless of whether the gas is neon or any other gas or gaseous combination.

The tube 14 is shown as provided with suitable electrode or terminal portions illustrated generally at 15 and 16. The details of these electrodes or terminal portions may be of any existing or suitable form and are well understood in the art. The illustrations of these portions of the tube are, therefore, more or less diagrammatic, but will suffice for the purposes of the present disclosure. The leads 17 and 18 are suitably connected with the opposite terminals or electrodes of the tube and it is through these leads 17 and 18 that the tube is usually connected across the secondary side of a transformer indicated at 19. The primary side of the transformer 19 is usually connected, as by means of leads 20, to the alternating current supply line, which may be at 110 volts or at any other suitable voltage.

In the illustrated embodiment, the transformer 19 is mounted within the compartment 21, which compartment is closed at the back by the back wall 22 of the casing 10, at the front by the backing 11, and at the top and bottom by the top and bottom walls 23 and 24, respectively, of the casing 10. The transformer 19 may be supported upon the bottom wall 24, as shown, or otherwise within the compartment 21.

The mounting for the tube 14 comprises a layer 26 of plastic or cementitious material or any wax or other equivalent compound or material, such as now used, for example, as the insulating compound in transformers and the like. Any material that may be applied in a similar or equivalent manner and which will adhere to the tube and backing or other support to support the tube thereon and which will, at the same time, be sufficiently yielding to permit expansion and contraction of the tube may be employed. Some forms of sealing wax are not sufficiently yielding, but I propose to amalgamate something such as beeswax or some other high melting point wax with sealing wax to make same suitable for the purposes of the present invention.

I find that "neon" or other gaseous tubes do not get extremely hot in operation. They do get warm, but not sufficiently hot to have any objectionable softening or other deleterious action upon the mounting materials above referred to. The mounting material may be of any suitable or preferred color or may be colored as desired.

In constructing a device embodying the invention, the backing and mounting material may be softened as, for example, by the application of heat, and applied as a coating or layer 26 over the entire tube supporting side of the backing 11. This coating 26 preferably covers the entire tube supporting side of the backing member 11 and is preferably of uniform or substantially uniform thickness. The thickness of the coating 26 may vary, as desired, but is preferably such that the adjacent rounded sides 27 (Figure 3) of the tube 14 may be embedded therein sufficiently to provide the desired support and backing for the tube. At the same time, the thickness of the coating 26 is preferably such that when the tube is applied, as shown in Figure 3, the adjacent walls of the tube will not contact with the backing 11, but will be spaced therefrom, preferably over the entire tube, by an intervening layer of the material 26. Where I refer to the tube mounting and supporting material as a cementitious material, or cementitious binder material, I intend to cover the materials above referred to and any equivalent materials.

After applying the layer of material 26, the tube 14 is then applied to this layer in the desired position and the cementitious material 26, firmly adhering to the adjacent walls or surfaces of the tube 14 as presented thereto and to the backing 11, will mount or support the tube 14 firmly and uniformly over its entire length. There is preferably some setting or hardening of the wax or other cementitious material 26 after the application of the tube 14 thereto, although an actual setting or hardening is not strictly necessary to the present invention, and a setting or hardening to a point where the material 26 loses its yieldability is preferably to be avoided.

As already pointed out, the sealing wax amalgamation and transformer insulating compounds referred to herein are illustrative as suitable materials for the purpose of the mounting, backing, sealing and insulating layer 26. I do not, however, intend to be limited to any particular material for this purpose, but any other equivalent, suitable or preferred material having the desired insulating, adhesion, supporting, sealing, and yielding properties may be employed.

In endeavoring to satisfactorily seal the electrode terminals of the tube illustrated diagrammatically at 15 and 16, the present practice is to tape the terminals of the tube and to employ various insulating fiber washer arrangements. The tube backing members 11 are usually provided with pockets 30 for receiving the terminal portions of the tube.

These pockets may be formed integral with the backing 11 or may be made up separately and suitably attached thereto. With the present invention, an insulating fiber washer 32 or other suitable insulating washer is preferably interposed between the end of the terminal portion 15 of the tube and the end wall of the pocket 30. A similar washer is preferably interposed between the opposite terminal portion 16 of the tube and the end wall of the pocket for receiving the same. These washers have openings through which the leads 17, 18 may extend to the tube terminals 15 and the washers have outwardly reduced ends 34, which fit in the lead receiving openings 35 and effectively insulate the leads from the backing member 11. The pockets 30 are preferably filled up around the electrode portions of the tube with the insulating mounting material 26, which material completely enclosing the terminal portions of the tube, as indicated at 38 in Figure 3 and filling the pockets 30 around these tube terminal portions hermetically seals the terminal portions of the tube and the leads thereto against leakage or moisture entry, which has heretofore been difficult to eliminate. The material 26, therefore, in addition to its tube mounting and insulating function hermetically seals the tube electrode terminals and tube leads. Heretofore, with insulator supports, separate supporters or spacers have been required between the tube and the tube backing and with the present invention, these may be eliminated, the material 26 providing a uniform backing and spacing layer over the entire back of the tube. The yielding character of the material 26 permits expansion and contraction of the tube and, in that a gaseous tube in operation does not get extremely hot, there is no deleterious effect upon the material 26 thereby.

Supporting insulators and the like, as well as the spacers referred to, are eliminated and the requirement for a looseness in the mounting with the increased cost, as well as the increased fragility and relatively high tube breakage, is also eliminated. The mounting of the tube is simple and expedient and that part of the material 26 within the tube electrode pockets 30, as indicated at 38, may be placed in these pockets either before applying the tube to the layer 26 or the filling up of these pockets and hermetically sealing of these portions of the tube may be done or completed after the application of the tube to the mounting layer 26.

Figure 4:
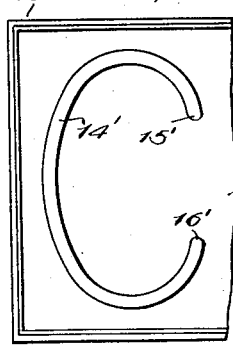
Figure 4 is a fragmentary front elevational view of another embodiment of the invention.
Figure 5:
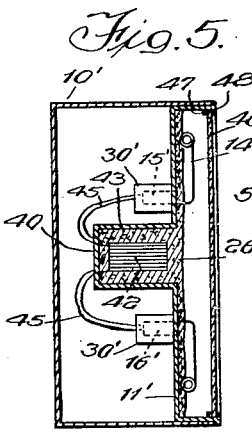
Figure 5 is a vertical section, taken on the line 5—5 of Figure 4.

In Figures 4 and 5, I have illustrated another embodiment, in which the tube 14' is formed into a single letter instead of an entire word, as before. In this case, the backing 11' has, in addition to the tube terminal pockets 30', an additional pocket 40 for a transformer 42. The transformer 42 may, in this case, be of the open type and it is disposed within the pocket 40 and completely surrounded, insulated, and hermetically sealed by the tube mounting material 26', which is filled into the pocket 40 to surround and completely enclose the transformer 42, as indicated at 43. With this arrangement, the transformer 42 may be hermetically sealed in the pocket 40 with the hermetical sealing of the tube terminals 15' and 16' in the pockets 30' and with the material 26', which forms the mounting and backing material for the tube or tubes 14'. The material 26' may be any of the materials set out in connection with the previous embodiment or any equivalent or suitable material with the desired properties, as already pointed out.

The leads from the transformer 42 to the tube terminals 15' and 16' are indicated at 45. The casing is indicated at 10' and the backing member at 11'.

In the embodiment of Figures 4 and 5, the front of the casing 10' is provided with a transparent closure 46. This closure 46 is preferably in the form of a glass pane although any other suitable or preferred transparent pane may be employed. The pane 46 may be seated marginally upon seating means 47 adjacent the front and internally of the casing and may be secured in place as by means of a marginal molding or other suitable means 48, which may be removable to permit removal and replacement of the pane. The pane mounting shown is illustrative and may vary widely within the scope of the present invention. Where a pane or closure member, such as the member 46 is employed, it keeps dirt and other foreign substances out, and protects the wax backing, as well as the tube or tubes and, at the same time, the display is visible through this pane in the same manner as without it.

Figure 6:
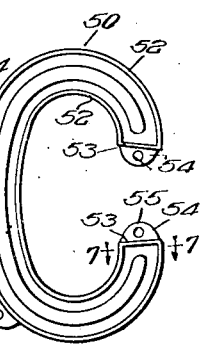
Figure 6 is a front elevational view of another embodiment of the invention.
Figure 7:
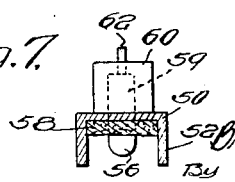
Figure 7 is a detailed sectional view, taken on the line 7—7 of Figure 6.

In the embodiment of Figures 6 and 7, the backing pan or member 50 is shaped to correspond with the shape of the particular letter, word or other display. In the illustrated embodiment, the pans or backing members 50 are made individual to the individual letters and each is trough or channel shaped in section, with the side flanges 52 and closed at the opposite ends at 53. The backing members 50 are preferably provided with integral tabs 54, apertured at 55 for mounting the individual letters, for example, as desired, as upon a common backing, to spell out the desired word thereon.

Of course, the entire word or other display may be made up as a unit and similarly mounted.

In the embodiment of Figures 6 and 7, the tube is indicated at 56 and is mounted by means of the layer of waxlike or other material 58, in the manner of the previous embodiment. The tube terminal portions 59 may be sealed in the pockets 60 by means of the material 58, as before, and the leads 62 may be hermetically sealed, as in the embodiments of Figures 1 to 3. The material 58 may be any of the materials set out in connection with the embodiment of Figures 1 to 3, or any equivalent or suitable material, with the desired properties. The front of the trough-like backing member 50 of Figures 6 and 7 may be covered with a suitable closure, as disclosed in connection with the embodiment of Figures 4 and 5, or may be left open, as shown.

I do not intend to be limited to the details shown and described.

I claim:

1. In combination, a backing member having a plurality of pocket means, a gaseous tube having a terminal portion disposed in one of said pocket means and having leads connected with the tube, a transformer for said tube disposed in another of said pocket means, said leads being connected to the transformer, and a layer of yielding waxy insulating material covering the backing member and adhering to the backing member and to the tube to support the tube upon the backing member, said material filling said pocket means and hermetically sealing the tube terminals, leads, and transformer to the backing member.

2. In combination, a backing member having a plurality of pocket means projecting from the face thereof, a gaseous tube having a terminal portion disposed in one of said pocket means and having leads connected with the tube, a transformer for said tube disposed in another of said pocket means, said leads being connected to the transformer, and a layer of yielding insulating material covering the backing member and adhering thereto and to the tube to support the tube upon the backing member, said material filling said pocket means and hermetically sealing the tube terminals, leads, and transformer to the backing member.

3. In combination, a backing member having a plurality of pocket means projecting from the face thereof, a gaseous tube having a plurality of terminals, each disposed in one of said pocket means and having leads connected with the tube, and a yieldable cementitious binder adhering to and yieldingly supporting said tube and hermetically sealing said terminal portion and said lead, said material filling said pocket means.

4. In combination, a supporting member having a plurality of pockets therein, a gaseous tube having a terminal portion extending into one of said pockets, a transformer for said tube disposed in another of said pockets, and a yieldable cementitious binder adhering to and yieldingly supporting said tube, said binder also insulating the transformer and sealing said transformer and terminal portion to said supporting member.

5. In combination, a backing member having a pocket, a gaseous tube having a terminal portion disposed in said pocket, and a layer of yieldable insulating material covering the backing member and adhering to the backing member and to the tube to support the tube upon the backing member, said material filling said pocket and sealing said terminal portion into said pocket.

6. In combination, a casing, a plurality of appropriately shaped channel-like backing members disposed in said casing, yielding insulating material disposed in the channel portion of said backing members, and a plurality of correspondingly shaped gaseous tubes disposed in the plane of said backing members and partially embedded in and yieldably supported by said insulating material.

7. In combination, a casing, a plurality of appropriately shaped channel-like backing members positioned in said casing, pocket means formed in said backing members, a layer of yielding insulating material disposed in said pocket means and over the inner surface of said channel shaped backing members, and a plurality of correspondingly shaped gaseous tubes partially embedded in and yieldably supported by said insulating material within the plane of said channel-shaped backing members, said tubes having terminal portions extending into said pocket means and supported and surrounded by said insulating material.

CLARENCE RINGWALD.